(12) United States Patent
Bones

(10) Patent No.: US 6,837,999 B1
(45) Date of Patent: Jan. 4, 2005

(54) PROCESS FOR DEWATERING OF SLUDGE

(75) Inventor: Oyvind Bones, Bergen (NO)

(73) Assignee: Sphagnum AS, Bergen (NO)

( * ) Notice: Subject to any disclaimer, the term of this patent is extended or adjusted under 35 U.S.C. 154(b) by 198 days.

(21) Appl. No.: 10/111,066

(22) PCT Filed: Oct. 23, 2000

(86) PCT No.: PCT/NO00/00351

§ 371 (c)(1),
(2), (4) Date: Jun. 10, 2002

(87) PCT Pub. No.: WO01/28939

PCT Pub. Date: Apr. 26, 2001

(30) Foreign Application Priority Data

Oct. 22, 1999 (NO) .............................................. 995153

(51) Int. Cl.$^7$ ................................................. C02F 3/32
(52) U.S. Cl. ...................... 210/602; 210/609; 210/689
(58) Field of Search ................................ 210/609, 689, 210/602

(56) References Cited

U.S. PATENT DOCUMENTS 6,145,666 A * 11/2000 Bones ............................ 209/4
6,620,321 B2 * 9/2003 Festa et al. .................. 210/602

FOREIGN PATENT DOCUMENTS

| JP | 51045059 | 4/1976 |
| JP | 9313875 | 12/1997 |
| WO | WO9401369 | 1/1994 |
| WO | WO9738805 | 10/1997 |

* cited by examiner

Primary Examiner—Robert A. Hopkins
(74) Attorney, Agent, or Firm—Francis C. Hand; Carella, Byrne, Bain et al.

(57) ABSTRACT

A process is described for dewatering a water-containing material by mixing *sphagnum* plants into the material as a structural element, and that the mixture thereafter is subjected to a drying process. By mixing *sphagnum* plant into to such water-containing materials, and thereafter by dewatering the material, traditional processing methods such as composting and incineration of such materials will be much improved.

11 Claims, No Drawings

PROCESS FOR DEWATERING OF SLUDGE

The present invention relates to a process for dewatering of a water-containing material, such as sludge, and processes for improving treatment methods such as composting and incineration.

Sludge is a heterogeneous mixture with a relatively high concentration of solid particles in a liquid. There are many types of sludge; sewage sludge, biological sludge, drilling mud, sludge at the bottom of rivers, etc. Some types of sludge are a result of natural processes, while other types of sludge are produced in industrial processes such as by filtering of liquids.

A concrete example on the latter is filtration of process water during oil production. In this purification process, clean process water comes out on one side (the filtrate) and sludge, containing impurities, on the other side. This sludge contains, amongst other things, small mineral particles, dead organic matter, some hydrocarbons (oil materials) and 50–90% water.

Most types of sludge contain lots of water, and are more or less foul smelling. Many of these types are also characterised as special waste—i.e. waste that is subjected to restrictions regarding collection and destruction by the authorities. The reason for a number of sludge types having to be processed as special waste is that the content, completely or partially, is comprised of components damaging to the environment and/or health. These components can be hydrocarbons as in "bio-sludge", or bacteria and parasite eggs as in sewage sludge.

Two common methods which are used in processing sludge are composting and incineration. These are carried out for a fee at officially approved sites. The fees for the processing are related to weight, calorific value and contamination level.

With composting, it is normal to mix in a structural material such as, for example, dried bark or woodchips. The structural material stabilises the matter to some extent, and creates a better environment for degrading organisms such as bacteria.

With incineration, one also mixes in a plant material (such as woodchips, bark) so that the sludge requires a lower supply of energy during the incineration.

Due to the high content of water, it is still rare that one achieves positive calorific values by mixing in woodchips for example. The result is that the incineration becomes both costly and energy demanding. The sole purpose with this mixing in of bark is to increase the calorific value. The mixing in of a structural material will also cause an increase in total weight.

Another method which is used to increase the calorific value of sludge is to dry the sludge. Because of the great risk of fluid leaching into the ground, it is common to carry this out in specially constructed drying devices. These sludge-drying devices operate largely according to the same principle as common household drum-dryers, but are much larger. They rotate, containing heating elements which speed up the drying, with air flowing through the device. The heating elements are comprised of heated plates situated inside the drum, and which come into direct contact with the sludge. The heat comes from a medium, such as oil or steam, which circulates inside the heating plates. In some cases, structural material is added when drying sludge in drying devices.

With all of the abovementioned methods for disposal of sludge one is troubled by foul odours. The odour becomes increasingly less noticeable as the sludge dries. During drying in a drum, one encounters problems with components in the sludge, such as tar materials and other hydrocarbons, sticking to the surface of the heating plates thereby reducing their efficiency. This leads to considerable limitations in the processing of many different types of sludge.

Thus, increased costs related to the weight increase must be weighed up against the cost gains resulting from increased calorific value.

A critical factor in all disposals of water-containing materials is that water results in a reduction in calorific value, and also reduced composting efficiency.

Therefore, a main object of the present invention is to provide a process for reducing the water content in a water-containing material, so that the sludge after such processing is better adapted to composting and/or incineration.

Therefore, it is an object of the present invention to provide a general process for the dewatering of various types of water-containing material, for example process water from industries such as the paper manufacturing industry and mechanical industry, and any type of sludge.

As different sludge materials are often foul smelling, the aim of the present invention is also to provide, in an early step in the process, an effective odour reducing effect.

It is also an object of the present invention to increase the biological degradation of the sludge material with regard to composting.

A number of different kinds of devices for drying of sludge materials are known. These normally function by contacting the water-containing material with heating plates in the drying device. It has been shown that to dry water-containing materials which contain sticky compounds such as, for example, various hydrocarbons, is a serious problem, as these stick to the heating plates and lead to reduced heating efficiency, and possible completely stop the operations. Thus, it is also an aim to provide a process in which conventional drying devices can be used to dry water-containing materials, which contain sticky compounds.

Thus, the present invention solves many of the problems which today are associated with processing of sludge-like materials.

Therefore, the present invention relates to a process for dewatering of a water-containing material, characterised in that, added to and mixed-in to the water-containing material is a material comprising of a quantity of partly dried *sphagnum* plants, and that the material thereafter is subjected to a drying process.

By mixing the *sphagnum* plant material into the sludge solutions, the problems which earlier were associated with sludge processing are solved.

Without being tied to a particular theory, it is our understanding that the structure of the plant material makes it possible for the liquid in the sludge to be taken up or absorbed by the plant so that the sludge material is transformed to a more solid form, which greatly simplifies the further processing of the material. *Sphagnum* plants have a higher affinity for oil than water, and some *sphagnum* plants are thereby first filled with oil while other plants take up water.

The relevant plant in this case comprises all species within the plant family Sphagnaceae and its genus *Sphagnum*, hereafter called *sphagnum* plants. In everyday language, the plant has several names, peat moss, bog moss and marsh moss.

*Sphagnum* plants form a dense continuous blanket on marshes (peat bogs), and are a subclass of the moss class. The class is comprised of only the family sphagnaceae, and one single genus *Sphagnum*. In the class *sphagnum* mosses there are 40 species in Norway and a total of about 300 in the world. All species are much alike, and they are so different from other moss species that one can immediately recognise the genus on first glance.

The moss is very common in temperate regions and is a common sight in marshes in Scandinavia, Canada and the northern most regions in Russia. The peat mosses are distinguished from other moss species by their characteristic structure and their unique food uptake system. An understanding of the structure and growth pattern of the moss is essential to be able to explain how these plants can exhibit such a surprising effect with regard to dewatering and disposal of sludge materials.

As the plants have no roots at all, they must take up water and essential minerals through pores in the leaf surfaces and into special storage cells, so-called hyaline cells. Water travels easily through the pores and are stored in the hyaline cells which can suck up and retain water quantities weighing up to 20 times the plant's dry weight. When the moss loses water through evaporation, thickening strands stiffen the storage cells so that they do not collapse. Thereby, the storage cells get filled with air.

Most of the *sphagnum* species grow with a length of about 1–5 cm per year. In a typical Norwegian marsh only the uppermost 5–10 cm of the shoots are green and carry out photosynthesis, while the lower parts are dead and are gradually transformed into peat. A more detailed explanation of the different layers which are formed in such bogs can be found in U.S. Pat. No. 5,635,029.

The criterion for the plant material to have the desired effect is, however, that it is dried before it is mixed in with the sludge. The principal reason for this is that the hyaline cells must be emptied of water so that there is room for the sludge, i.e. the sludge replaces the air in the dry hyaline cells. Experiments have also shown that the preference for absorbing hydrophobic compounds as opposed to hydrophilic compounds is strengthened when the plants are dry.

Thus, the plant material which is used in relation to the present invention is characterised by it being harvested from a marsh, which preferably contains large amounts of *sphagnum* plants. Furthermore, only a top layer of the marsh is harvested, i.e. the part which contains living plant material, and the part which contains only partly degraded plants. How far down into the marsh this stretches depends on, amongst other things, the geographic location of the marsh. In Norway, it is typical to harvest a layer of around 10–15 cm.

Thus, it must be emphasised that this material is very different from peat. Peat can be collected from the same marsh, but here the material is collected much further down in the marsh, for example all the way down to 10 meters.

It must also be mentioned that when the uppermost layer is harvested, the resource is renewable, and new living plants will quickly grow up again.

To achieve a sufficient sludge absorbing effect, it is appropriate to partly dry the plants. In this way, the hyaline cells are emptied of water, and they are prepared to take up or absorb "new" compounds.

This drying treatment can simply be carried out with the plants being spread out over a large surface, for example in a storehouse, and air-dried at ambient temperature. After this drying treatment, the specific gravity of the plants becomes very low, and this is particularly advantageous as the costs for disposal of the material is often related to weight.

When the plant material is added to a sludge solution, and mixed in with this (for example by stirring) the plant cells will quickly absorb liquids. The result is a peat-like matter, i.e. a much more solid consistency. This simplifies the subsequent processing.

As soon as the plant material is mixed in with the sludge material, the liberation of foul odours diminishes. Thereby, the material can be stored without any problems, for example outdoors, without any foul odours diffusing into the environment. The mechanism which leads to this reduction in odour has not been studied sufficiently, but it is known that the plants exchange protons with the environment and thereby reduce the pH value of the environment. This can provide a contribution to a general anti-bacterial effect so that the production of foul smelling gasses is reduced. It is also believed that this is the reason for the dry sludge containing *sphagnum* plants not overheating or going on fire, something that represents a great problem with the use of other structural materials such as bark or woodchips.

A further advantage is that the sludge containing plant material immobilises the water in the sludge so that leaching into the ground is avoided. The material can thereby be stored in conventional storage halls.

Furthermore, the plants provide the mixed material (*sphagnum* plants and sludge) with a structure which improves the evaporation of water, so that the plant material aids in the dewatering or dehydration of the sludge in a very efficient way. By spreading the material over a surface (for example the floor in a storage building), and letting the material dry at ambient temperature, it is possible to remove as much as 83% of the water (calculated from a reduction in weight) during a storage time of 12 weeks.

When the water quantity is reduced, the calorific value increases. Furthermore, the structure and low specific gravity of the plant material will also contribute positively to an increased calorific value. Thus, this effect can in this way, be used at any dewatering of a water-containing material, and the present invention is thus not limited to the processing of various forms of sludge.

The plant is also a structure enhancing material which speeds up the microbial degradation in composting, and transforms a sludge rich in nutrients to a valuable soil.

A problem with conventional "drying" of sludge is that the sludge material sticks to the surface of the drying elements. By mixing *sphagnum* plants into the sludge material, this is also prevented as the sticky materials will then envelop the sludge structure. We have shown that *sphagnum* plants really do "clean" the heating surfaces in a drying process in conventional drying devices.

As mentioned, the specific gravity of this special plant material is so low that it will not result in the waste getting an initial weight increase of significance. As an example, 1 cubic meter plant material (33 kg) is mixed into 1 tonne bio-sludge containing 88% water. The result is that the foul smelling sludge is quickly transformed into a firm, particulate mass with insignificant odour and no leaching. The weight increase arising from inclusion of the plant material is in this case only 3.3%, and because the liquids are absorbed into the plant material, the volume increase is only 50%. At the mixing in of the *sphagnum* plants, the volume will increase initially, but decreases gradually as the water evaporates, and at the end the volume increase is insignificant.

It shall be mentioned that if bark is used as structure- and calorific value improving material, then the weight increase is much higher, as bark has a specific gravity which is 7–8 times higher that that of the *sphagnum* plants. Furthermore, we have shown that if the *sphagnum* plants are crushed, the effect will be reduced significantly. This emphasises the fact that it is the structure-providing and absorbing effect of the moss which is important.

All these advantages mean that the plant material can be mixed into the sludge at an early stage because it does not contribute with a significant weight increase, and one can in this way benefit from all the abovementioned advantages before the sludge is sent further for destruction. In addition, the transformation of the sludge from a liquid form to a solid form will result in lower costs for storage and transport.

Some experiments carried out in which dried *sphagnum* plants are used in the processing of sludge, are given below:

EXAMPLE 1

400 liters foul smelling bio-sludge (collected from Statoil Mongstad) (specific gravity 1167 grams per liter) containing 12% dry matter, 2–5% oil and the remaining being water, is added to 400 liters dried *sphagnum* plants. After a few minutes of mixing by means of a spade, the sludge is converted to a peat-like material without an unpleasant odour. The volume of the new material appears to have increased somewhat (about 50%) in relation to the original volume of the sludge of 400 liters. The new material is immediately weighed and has a specific gravity of 750 grams per liter. The material lies outdoors under a roof for 12 weeks (average temperature about 12° C.), and the mixture is arranged in rows (extended pyramid shape), with a height of about 0.5 meters. The mixture is turned once a week. After 8 weeks, the specific gravity is reduced to 217 grams per liter (i.e. 29% of 750) and at the same time the volume is reduced to about 400 liters. We appreciate that most of the water has evaporated during this period. The odour has almost disappeared, and has in addition changed from sewage-like to something that is reminiscent of mothballs (naphthalene). It appears that it is the odours of hydrocarbons and moss which now dominate.

In a corresponding experiment, we have also tested a quantity ratio (volume:volume) between sludge and *sphagnum* plants of 1:2, but the increased fraction of plants did not lead to an improved effect. It is possible therefore, that one can reduced the quantity of plant material further and still achieve a satisfactory effect. We are in the process of carrying out experiments to clarify this.

EXAMPLE 2

A homogeneous and fresh mixture of 10 liters dried *sphagnum* plants and 10 liters sludge (same type as above) is fed into a concrete mixer. The drum rotates and the mixture is loose and airy. No sludge is sticking to the drum and blades, and no "balls" are made. The mixture is regarded as optimal for drying in a drum, and the *sphagnum*-moss is regarded to be an ideal structure-giving agent in drying of sludge in drying devices.

EXAMPLE 3

A drying test in a drying device with the same volume of *sphagnum* plants and bio-sludge was carried out. The sludge had a specific gravity of 1167 grams/liter. To one liter sludge was added 33 grams (1 liter) *sphagnum* plants. The sludge contains 140 grams dry matter, 23–58 grams oil and 969–1004 grams water.

25 liters of wet sludge mixture containing *sphagnum* plants was dried in a conventional sludge drier (of the type rotadisk drier), at an average temperature of 120 degrees Celsius. Maximum temperature during the drying process was 225 degrees Celsius. The drying shows that the sludge mixture was well suited to drying in a rotadisk-drier. This is in spite of the sludge containing oil compounds which traditionally lead to significant deposit problems in drying appliances such as this.

No contamination of, or sticking to, the heating surfaces was observed. The materials did not clump. After the drying process the material had the consistency of fine powder, something like the powder of gunpowder. The sludge was then dried to a degree of drying of 98%, and the density of the material was about 1000 kg/m$^3$.

Thus, the reduction in weight of the sludge mixture was 958–993 grams if it is assumed that only water had evaporated. This results in a weight reduction of 80–83% in relation to the sludge mixture (1200 grams).

Total reduction in weight in relation to the initial weight of the bio-sludge is 925–960 grams if the added *sphagnum* plant (33 grams) is taken into consideration. This gives a weight reduction of 79–82% in relation to the initial weight (1167 grams).

The drying process shows that by mixing *sphagnum* plants into the oil-containing sludge, the weight can be reduced to 1/5 of initial weight, and the stickiness of the sludge to the heating surfaces is much reduced or possibly eliminated completely. It has previously been a problem that oil compounds in oil-containing sludge burn themselves into the heating surfaces. This is avoided by mixing dried *sphagnum* plants into the sludge.

EXAMPLE 4

The objective with this experiment is to document that different structural materials have different abilities to solidify sludge, and prevent leaching to the surroundings.

A sludge sample collected from the bottom of a pond with a mud bottom was used. The sludge contained a lot of water and could be characterised as half liquid, half solid matter. Droplets ran from it.

Mixed into three samples, each weighing 160 grams, were 3 different structural materials, namely *sphagnum* plants, peat and bark. 20 grams of each of these were mixed in, so that the ratio between structural material and sludge, based on weight:weight, was about 1:8.

The samples were placed in separate plastic bags. The amount of liquid the different samples displaced was tested in a 1 liter measuring container. Initially, water plus the samples came to 1 liter, and the remaining water was weighed after the samples were removed from the 1 liter measuring container.

The consistency of the three samples was very different. The sample to which *sphagnum* plants had been added had a consistency which can be compared with partially dried grass. The sample to which peat was added was like damp mould, and the sample to which bark was added was like a gleaming wet dough.

The sample with *sphagnum* plants made up a volume of 0.444 1, while the peat sample and the bark sample made up volumes of 0.255 and 0.196 1, respectively.

From this it can be concluded that *sphagnum* plants dry, bind and solidify the sludge considerably better than peat and bark. The visual observations are supported by the volume measurements. Because of the considerably lower density of the dried *sphagnum* plants than of bark and peat, one will get appreciably more structural material, as it is the volume which is the essential factor.

EXAMPLE 5

27 tonnes of bio-sludge from Statoil-Mongstad (details on the sludge given in example 1) was dried in an Atlas-Stord Rotadisc Drier TST-2-3. Sludge and moss (0.5–1.5 percent by volume) were mixed before the drying in the device.

Result: 5.5 tonnes dry sludge, with the consistency of powder like gunpowder, 4% water.

Conclusion: *Sphagnum* plants are an ideal structural material for drying of oil-containing sludge. This material also cleans heating surfaces during the process by absorbing liquids such as oil and water.

This sludge is regarded as a problem sludge and no-one, neither Norwegian nor foreign operators, have hitherto managed to dry sludge such as this in drying devices.

EXAMPLE 6

Atlas-Stord Rotadisc Drier TST-2-3 was filled (completely) with dry *sphagnum* peat. Thereafter, bio-sludge from Statoil-Mongstad was added.

Result: The dryer became full of clumps which could not be dried. The drying process was stopped, and the device had to be emptied manually. (The large amounts of peat absorbed the oil so that it did not burn into the surface.)

Conclusion: *Sphagnum* peat can (at least to some extent) absorb the oil, but does not give sufficient structure for the drying process. *Sphagnum* moss is superior to *sphagnum* peat for drying processs such as this.

What is claimed is:

1. A process for dewatering of a water-containing material, said process comprising the steps of obtaining an amount of partly dried *sphagnum* plants harvested from the top layer of a marsh;

obtaining a water-containing material;

mixing said amount of partly dried *sphagnum* plants into said water-containing material to obtain a mixture thereof; and thereafter subjecting said mixture to a drying process in a drying device employing a heating medium.

2. A process as set forth in claim 1 wherein said heating medium is selected from the group consisting of oil, steam, water and electricity.

3. A process as set forth in claim 1 characterized in that said water-containing material is a sludge material.

4. A process as set forth in claim 3 characterized in that said sludge material is selected from the group consisting of bio-sludge, process water, sewage sludge, river sludge and oil-containing sludge.

5. A process as set forth in claim 1 characterized in that the ratio between said water-containing material and said partly dried *sphagnum* plants is of the order of 1:0.1 to 0.1:1 based on volume.

6. A process as set forth in claim 1 characterized in that the ratio between said water-containing material and said partly dried *sphagnum* plants is of the order of 1:1 based on volume.

7. A process as set forth in claim 1 characterized in that the ratio between said water-containing material and said partly dried *sphagnum* plants is of the order of 100:1 to 100:10 based on weight.

8. A process as set forth in claim 1 characterized in that the ratio between said water-containing material and said partly dried *sphagnum* plants is of the order of 100:3 based on weight.

9. A process as set forth in claim 1 characterized in that said mixture is dried until reaching a consistency akin to solid matter.

10. A process as set forth in any one of claims 1 to 9 further comprising the step of thereafter composting said mixture.

11. A process as set forth in any one of claims 1 to 9 further comprising the step of thereafter incinerating said mixture.

* * * * *